United States Patent
Göhrle et al.

(10) Patent No.: US 10,486,484 B2
(45) Date of Patent: Nov. 26, 2019

(54) METHOD FOR CONTROLLING AN ACTUATOR

(71) Applicant: AUDI AG, Ingolstadt (DE)

(72) Inventors: Christoph Göhrle, Ingolstadt (DE); Andreas Schindler, Ingolstadt (DE); Andreas Unger, Gaimersheim (DE); Oliver Sawodny, Stuttgart (DE)

(73) Assignee: Audi AG, Ingolstadt (DE)

( * ) Notice: Subject to any disclaimer, the term of this patent is extended or adjusted under 35 U.S.C. 154(b) by 4 days.

(21) Appl. No.: 15/036,282

(22) PCT Filed: Nov. 7, 2014

(86) PCT No.: PCT/EP2014/002982
§ 371 (c)(1),
(2) Date: May 12, 2016

(87) PCT Pub. No.: WO2015/070962
PCT Pub. Date: May 21, 2015

(65) Prior Publication Data
US 2016/0280035 A1    Sep. 29, 2016

(30) Foreign Application Priority Data
Nov. 13, 2013 (DE) .......... 10 2013 018 923

(51) Int. Cl.
*B60G 17/0165* (2006.01)
*B60G 17/018* (2006.01)
*B60G 17/019* (2006.01)

(52) U.S. Cl.
CPC ....... *B60G 17/0165* (2013.01); *B60G 17/018* (2013.01); *B60G 17/019* (2013.01);
(Continued)

(58) Field of Classification Search
CPC ............ B60G 17/0165; B60G 17/019; B60G 17/018; B60G 2400/252; B60G 2400/821;
(Continued)

(56) References Cited

U.S. PATENT DOCUMENTS 3,821,798 A * 6/1974 Cannon .............. G11B 5/00817
360/51
4,685,698 A  8/1987 Klinker et al.
(Continued)

FOREIGN PATENT DOCUMENTS

CN    102271970 A    12/2011
CN    102292249 A    12/2011
(Continued)

OTHER PUBLICATIONS

Temporal Filtering FAQ, Accessed Mar. 23, 2013, http://mindhive.mit.edu/book/export/html/116.*
(Continued)

*Primary Examiner* — Spencer D Patton
(74) *Attorney, Agent, or Firm* — Henry M. Feiereisen LLC

(57) ABSTRACT

The invention relates to a method for controlling at least one actuator (16, 18) for a chassis of a motor vehicle, in which at least one sensor (10, 12, 14) of the motor vehicle determines values of at least one measurement variable for sensing an environment of the motor vehicle, wherein the determined values are preprocessed, wherein only the values needed to control the at least one actuator (16, 18) are transmitted from a control device (4) associated with the sensor to a control device (6) associated with the actuator and are temporally filtered by the control device (6) associated with the actuator, and wherein the control device (6)
(Continued)

associated with the actuator uses the temporally filtered values to provide actuating signals for the at least one actuator (16, 18).

10 Claims, 1 Drawing Sheet

(52) U.S. Cl.
CPC .... *B60G 2400/252* (2013.01); *B60G 2400/82* (2013.01); *B60G 2400/821* (2013.01); *B60G 2401/14* (2013.01); *B60G 2401/174* (2013.01); *B60G 2401/176* (2013.01); *B60G 2401/21* (2013.01); *B60G 2500/10* (2013.01); *B60G 2600/60* (2013.01)

(58) Field of Classification Search
CPC ........... B60G 2400/82; G60G 2600/60; G60G 2600/28; G60G 2600/182
See application file for complete search history.

(56) References Cited

U.S. PATENT DOCUMENTS

| | | | |
|---|---|---|---|
| 5,848,663 | A | 12/1998 | Kuriki |
| 8,762,000 | B2 | 6/2014 | Schindler et al. |
| 9,108,482 | B2 | 8/2015 | Mohrlock et al. |
| 9,205,874 | B2 | 12/2015 | Schindler et al. |
| 9,321,323 | B2 | 4/2016 | Schindler et al. |
| 2010/0049394 | A1* | 2/2010 | Ammon ............. B60G 17/0165 701/31.4 |
| 2013/0099455 | A1 | 4/2013 | Beringer et al. |
| 2014/0195112 | A1* | 7/2014 | Lu ......................... B60G 17/015 701/37 |
| 2015/0191071 | A1 | 7/2015 | Schindler et al. |

FOREIGN PATENT DOCUMENTS

| | | |
|---|---|---|
| DE | 10 2008 007 657 A1 | 8/2009 |
| DE | 10 2008 032 545 A1 | 1/2010 |
| DE | 10 2011 007 608 A1 | 10/2012 |
| EP | 0 412 719 A1 | 2/1991 |

OTHER PUBLICATIONS

Biswas et al., "Assessing the Completeness of Sensor Data," Database Systems for Advanced Applications, DASFAA 2006, pp. 717-732 (Year: 2006).*
Stokes, Jon, "Understanding Bandwidth and Latency," Ars Technica, 2002, https://arstechnica.com/features/2002/11/bandwidth-latency/5/ (Year: 2002).*
English copy of International Search Report issued by the European Patent Office in International Application PCT/EP2014/002982.
Chinese Search Report issued by the Chinese Patent Office in Chinese Application No. 2014800618835 dated Apr. 28, 2017.
English translation of Chinese Search Report issued by the Chinese Patent Office in Chinese Application No. 2014800618835 dated Apr. 28, 2017.

* cited by examiner

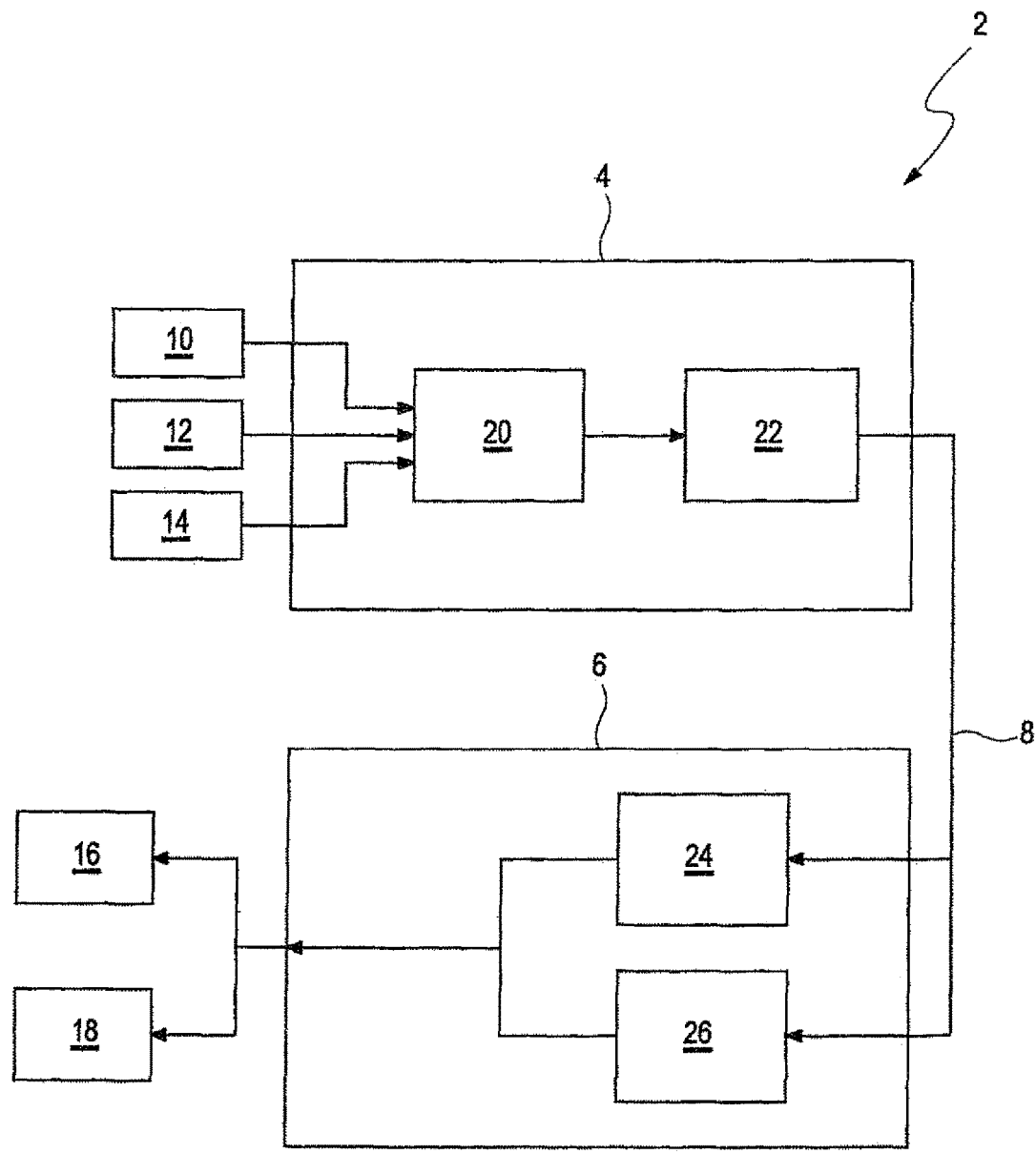

METHOD FOR CONTROLLING AN ACTUATOR

CROSS-REFERENCES TO RELATED APPLICATIONS

This application is the U.S. National Stage of International Application No. PCT/EP2014/002982, filed Nov. 7, 2014, which designated the United States and has been published as International Publication No. WO 2015/070962 and which claims the priority of German Patent Application, Serial No. 10 2013 018 923.3, filed Nov. 13, 2013, pursuant to 35 U.S.C. 119(a)-(d).

BACKGROUND OF THE INVENTION

The invention relates to a method and a system for controlling at least one actuator of a chassis of a motor vehicle.

A motor vehicle may have a plurality of sensors and actuators. A sensor is therefore respectively designed for the purpose of measuring values of measurement variables that are relevant for operating the motor vehicle. The values acquired by sensors are typically to be processed by a control device of the motor vehicle. On the basis of these values, actuating signals are provided by the control device for the actuator, to which a component of the motor vehicle is applied.

Against this background, a method and system are presented with the features of the independent claims. Further embodiments of the invention will become apparent from the dependent patent claims and the description.

The method according to the invention is provided for controlling at least one actuator of a chassis of a motor vehicle. Values of at least one measurement variable for measuring an environment of the motor vehicle are therefore determined by at least one sensor. The determined values are preprocessed. Furthermore, only those values necessary for controlling at least one actuator, among other things, are determined in a preprocessing of the values. Only those values that are required or necessary for controlling the at least one actuator are transmitted by a sensor-associated control device to a actuator-associated control device. In addition, only the values provided for controlling the at least one actuator are temporally filtered by the actuator-associated control device. Actuating signals for the at least one actuator are provided by the actuator-associated control device from the first preprocessed and then temporally filtered values.

Typically, the environment or a vicinity of the motor vehicle is determined by the at least one sensor using electromagnetic waves, for example, those based on laser, video and/or radar. A height profile of a ground is ascertained here, usually of a roadway that is traveled by the motor vehicle. This acquired height profile can be evaluated with preprocessing provided as part of the method. This may also include the measure to locally filter the values determined by the sensor for acquiring the height profile, for example, by forward-backward filtering or by a sliding weighted average. In addition, typical unevenness of the ground is recognized, whereby such unevenness is specified by means of various methods. Only values for such unevenness that affect continued driving of a motor vehicle are required and used to control the at least one actuator. The at least one actuator can be predictively controlled and/or activated via the thus selected and/or extracted values. In an embodiment, for a comparatively high unevenness along the height profile of the ground, a decision can be made regarding the fact that a structure of the motor vehicle is raised along a future route to be traveled, along which the high unevenness is arranged, whereby the at least one actuator is provided a longer route for tightening a wheel. In an embodiment, only those values for controlling the at least one actuator are selected, the information consists about a recorded comparatively high unevenness along the ground.

Furthermore, the values determined by the at least one sensor are preprocessed by the sensor-associated control device and, for example, are locally filtered there. Furthermore, only certain values from the height profile are selected and transferred from the locally filtered values. Alternatively or additionally, the values determined by the at least one sensor are preprocessed by the at least one sensor and thereby locally filtered or pre-filtered. In a preprocessing of the values determined by the sensor-associated control device and/or the at least one sensor, also only those values, among others, that represent the roadway to be possibly traveled by the wheels can be selected or extracted from all determined values. Therefore, a preprocessing can be performed, for example, local filtering and/or selection, the sensor information to be used in a first step by the at least one sensor and in a second step by the sensor-associated control device. Here, a possibly rough preprocessing of the values performed by the at least one sensor can be subsequently refined by the sensor-associated control device through a more exact preprocessing. In an embodiment, the preprocessing includes a local-filtering and/or detection of unevenness, which is to be considered for controlling the at least one actuator. The local filtering includes a phase-free high or low pass filtering with forward-reverse filtering or filtering with a moving average (moving average filter).

SUMMARY OF THE INVENTION

After preprocessing of values determined by the sensor, only those values which describe the height profile of the ground, usually the values of unevenness along the ground, and which are necessary for the control of the actuator are selected. Unevenness which lies on a stretch of the ground to be traveled by a wheel and which can be traveled by a steering maneuver can thereby be identified. Such a selection may be performed by a control device, which is designed as a component of the at least one sensor, or performed by a control device associated with the described sensor. Furthermore, values acquired by various sensors regarding the environment of the motor vehicle can be merged to the sensor-associated control device and the height profile of the ground can be provided by summation, for example, mean value formation of these values. A height profile provided via the determined values is preprocessed on the sensor-associated control device and locally filtered there. Alternatively or additionally, unevenness along the ground can be recognized in this preprocessing. Only the values required for this control for the at least one actuator are transmitted to the actuator-associated control device in a subsequently described, fast clock cycle.

In one embodiment, those values are chosen from the determined values of the at least one measurement variable for at least one preprocessing, which concern the height profile of the ground traveled by the motor vehicle and are necessary for the control of the actuator.

In a further embodiment of the method, the values determined by the at least one sensor are processed or preprocessed in a first temporal clock cycle, wherein such processing of the values includes their preprocessing, i.e., their local filtering through the sensor-associated control device and/or through the at least one sensor. These preprocessed and thus e.g., locally filtered, values are transmitted from the sensor-associated control device in a second temporal clock cycle to the actuator-associated control device, wherein the second temporal clock cycle is faster than the first temporal clock cycle.

The system according to the invention is designed for controlling at least one actuator of a chassis of a motor vehicle and includes a sensor-associated control device and an actuator-associated control device. Here, values of at least one measurement variable for ascertaining an environment of the motor vehicle are to be determined, wherein the determined values are preprocessed.

Furthermore, only those values determined by sensors which are required for controlling the at least one actuator are to be transmitted from the sensor-associated control device to the actuator-associated control device and are to be temporally filtered by the actuator-associated control device. Control signals for the at least one actuator are to be provided by the actuator-associated control device from the temporally filtered values.

When preprocessing, the values determined by the sensor are high-pass filtered and/or low-pass filtered so that they are phase-free. This can be a local forward-backward filtering with a FIR filter (finite impulse response filter), which may also be referred to as a transversal filter with a finite impulse response and/or can be performed with a UR-filter (infinite impulse response filters). Alternatively or additionally, in the preprocessing, a locally weighted moving average can be used with a weighting function to process the determined values, which usually corresponds to a convolution with a definable function such as a weighting function.

The sensor-associated control device is designed for the purpose of locally filtering determined values from the at least one sensor as part of a processing of these values.

As a further component, the system can still have at least one sensor which is designed to acquire values of the at least one measurement variable with respect to the environment of the motor vehicle. The at least one sensor is designed to acquire values for a height profile as the at least one measurement variable of a formed ground, usually a roadway, traveled by the motor vehicle.

In addition, the system has a communication link over which the sensor-associated control device and the actuator-associated control device are connected to each other for transmission of the preprocessed values. As part of the preprocessing, for example, a plurality of determined values is preprocessed for a performed local filtering, which describe the height profile along a section of a plurality of equidistant or non-equidistant sampling points. After the preprocessing, a few values are selected. These few values are sent to the actuator-associated control device that calculates a manipulated variable from these values for the at least one actuator.

The system provides a modular control structure, i.e., a modular closed-loop and/or open-loop control structure, for the at least one actuator and thus for the motor vehicle. The system includes the first sensor-associated control device which is associated with sensors and connected to these and may also be referred to as a first, near-sensor control device: The values determined by the sensors and thus raw data from measurement variables are sent to the sensor-associated control device. The actuator-associated control device that can also be referred to as a second, near-chassis and/or near-actuator control device is thus associated with the chassis and thus actuators of the chassis, wherein this second control device is designed to send formed signals as actuating signals to the actuators for application on the chassis and thus to the wheels of the vehicle. An associated control device may still further be provided to the actuators, which adjusts provided actuating variables in an actuator via actuating signals.

By distributing a closed-loop control to two control devices, anticipatory closed-loop control of the chassis is possible. A part of the closed-loop control is calculated by the sensor-associated control device in the processing of the values in order to send a small amount of values of data via the communication link, for example, a bus, wherein the relatively few values to be transferred just yield lower latency or delay. Afterwards, both the devices associated with the sensor and actuator can react faster to information from the sensors and thus have a comparably large usable predictive distance.

With such a predictive distance, that section of the ground to be traveled by the motor vehicle is considered, which can be used for controlling the actuator. The predictive distance of the sensor is thereby usually unchanged. In embodiments of the disclosed method, those preprocessed values which are intended for actual control of the at least one actuator are provided to the actuator-associated control device with low delay, so that the actuator-associated control device can control, typically by closed-loop control the at least one actuator in a timely manner. A predictive distance in meters remains the same, since a viewing angle and a sensor position are constant. However, the usable predictive distance depends on the speed of the motor vehicle. Since only a small number of values are considered and transmitted to the actuator-associated control device under the fast clock cycle, the projection over the ground is subjected to only a slight time delay, so that the motor vehicle can also travel at higher speeds, and yet there are sufficient values for an acceptable long distance of the ground to be traveled for this height profile. It is also considered that values of the height profile of the ground which are determined by the sensor from a smaller distance are more accurate. Furthermore, these more exact values can be used after the preprocessing, wherein only the values relevant for the actuator are determined, also for application on the at least one actuator by the actuator-associated control device.

Individual modules for performing the closed-loop control are distributed to the two control devices for the predictive closed-loop control of the chassis. In the first, sensor-associated control device, raw data goes in as values. There is a large number of data in this raw data, which concern, i.e., distance measurements to the ground or to the roadway or in general distance measurements to objects in the environment of the motor vehicle, which are located respectively in view of the sensors.

For example, in a sensor designed as a camera, several thousand values for the distance to the ground over which the wheels travel are determined in regular time intervals of, for example, 40 ms for a video-based system. For a sensor designed as a laser, data for a pulse transit-time measurement of a beam emitted from the sensor as well as various information about distances is provided for each measurement performed at a point in time.

Furthermore, it can be decided directly from the at least one sensor in a first preprocessing step as to which measured distances to roadway traveled by the motor vehicle and to which to an object, e.g., another vehicle or a tree belong. Based on a decision made by the sensor, only values for a distance between the sensor and the roadway will be sent to the first sensor-associated control device. Alternatively, all values from the sensor are transmitted without processing to the first control device that decides in an initial step of the preprocessing, which measured values concern distances to the roadway and thus the ground to be traveled and which values concern distances to other objects.

An accurate proper motion of the motor vehicle is specified via the values of the sensors. Data or values of several different sensors are merged, i.e., united and the resulting information averaged over time to obtain a more accurate height profile of the ground and/or the roadway.

The system used here is a height profile, which extends, for example, over a section of the roadway between two positions x1 and x2, where, for example, x1=−20 m and x2=20 m. Here, for example, a position x0 of a front axle is designated as a reference and thus a front wheel of the motor vehicle. In an embodiment, a sensor measures the roadway ahead to the second position x2. Information which includes the height profile up to the first position x1 and which has already left behind the motor vehicle during the travel are determined from previously acquired and already stored values.

Control signals are determined from stored values and from the spatially and temporally filtered values with information about the height profile of the roadway, which are transmitted at least to actuators for application on the two wheels designed as front wheels and possibly also to actuators for wheels designed as rear wheels. The data can also be transmitted to regularly successive time points which are spaced from one another by constant time intervals. A clock cycle defined by a time interval in which the sensors provide new values, are to be adjusted comparatively slowly and to the length of the time interval, e.g., during which new values from the sensors are provided. The data designed as actuating signals are transmitted to the actuators within a time interval, which may be shorter than that time interval during which the values of the sensors are determined. This means that the values are ascertained for the environment of the motor vehicle by the at least one sensor through measuring in the second, slow temporal clock cycle. In contrast, data for application on the at least one actuator of the actuator-associated control device are processed in the second, faster clock cycle and conveyed to the at least one actuator. This concerns values for describing the height profile of the around, which is traveled over next by wheels of the motor vehicle. By merging the values of a plurality of sensors, a faster clock cycle for the creation of the height values can be realized since the sensors usually provide and forward new information at different times with the values determined. The second, faster clock cycle with which an actuator is driven is always the same in an embodiment, wherein only the appropriate and/or required values are extracted and/or interpolated.

In an embodiment of the invention, a course of the height profile is determined directly afterwards with the system by processing the values. A local filtering and/or recognition detects whether a defined unevenness exists along the height profile, i.e., whether there is an uneven, not smooth roadway as part of an inaccuracy of the sensors. To describe the height profile, a constant number of values is sent to the second, actuator-associated control device. Values are always sent here, which may be zero if necessary. If no unevenness is recognized along the ground, the values are set to zero.

Independent of a concrete embodiment of the method, few values are sent in a fast clock cycle, e.g., for each wheel a value for a height and a value for its first derivative or for each front wheel, a value for the height and its first derivative, wherein for the rear wheels the same few values for the height and its first derivative are provided shifted in time by the second control device. Further, values of other derivatives, for example, of the second derivative, may also be taken into account. In addition, the values of the second control device are temporally filtered, since it is calculated by the second control device in a faster clock cycle which, for example, is defined over a time interval of 2.5 ms, and data in a clock cycle by a time interval of, for example, of 5 ms are transferred, so that in this case, values or data are temporally filtered in a clock cycle of 2.5 ms.

Before the temporal filtering, values can be transferred with a rougher signal over the communication link, which is thereby loaded less, whereby a low latency or delay is achieved.

In a plausibility check of the height profile ascertained by sensors, this is verified by checking whether the accelerations and/or wheel deflection occurring in the motor vehicle fit this high profile. Here, a height profile driven over beneath the wheel is estimated from the accelerations and/or wheel deflections and compared to the values of the height profile measured by the sensors for ascertaining the environment. Such a plausibility check is executed with the second actuator-associated control device, in which measured values for a wheel suspension, for body accelerations, for body rotation rates and for a speed of the motor vehicle are directly present.

Typically, the height profile of the ground to be traveled is checked for plausibility based on measurement variables of the motor vehicle. This takes into account that the height profile for predictive closed-loop control of at least one actuator may be faulty, which may be dependent on inaccuracies of a sensor but also on external conditions, for example, weather and/or weather conditions, as well as on brightness (day or night).

As part of the plausibility check of the height profile to be performed, kinematic variables of the motor vehicle that are also determined by sensors, for example, a speed or an acceleration of the motor vehicle, a wheel jounce of a wheel of the motor vehicle, an acceleration of a body of the motor vehicle or a rotation rate of the body of the motor vehicle are considered for the plausibility check of the height profile. This height profile based on kinematic variables is compared with that height profile that is provided by the sensors for ascertaining the environment. In the case of the plausibility check where the profiles ascertained by different sensors do not match each other, a provided closed-loop control of the at least one actuator can be retracted or turned off.

A comparison of the height profile is performed for a certain period of time which extends between a point in time from the past and a current, present point in time. A quality measure about a correspondence of the height profiles, a cooperation function or a difference between the two height profiles can also be considered here. An estimate of the height profile based on kinematic variables of the motor vehicle can be performed based on a model where a quarter, half or whole model are considered for a vertical dynamic of the motor vehicle. A state of the model at a next time can be predicted here and corrected via the measured kinematic variables. The height profile is formulated as a state of dynamic equations here. In a further embodiment, no model of the motor vehicle is used. To estimate the height profile, values determined by the sensor, for example, are high-pass filtered and integrated once, by which the vertical distance traveled by the body can be calculated from a vertical acceleration of a body of the motor vehicle over the wheel.

This vertically oriented path less a path for a wheel deflection yields the height profile under each wheel of the motor vehicle.

Further advantages and embodiments of the invention will be apparent from the description and the accompanying drawings.

It is understood that the features mentioned above and those yet to be explained are applicable not only in the particular combination indicated but also in other combinations or alone without departing from the scope of the present invention.

BRIEF DESCRIPTION OF THE DRAWING

The invention is illustrated schematically with reference to an embodiment in the drawing and is described schematically and in detail with reference to the drawings.

FIG. 1 shows a schematic representation of an embodiment of a system according to the invention.

DETAILED DESCRIPTION OF PREFERRED EMBODIMENTS

FIG. 1 shows in schematic representation of the embodiment of the system 2 according to the invention that has as components at least a first control device 4 associated with the sensor and a second, control device 6 associated with the actuator, which are here connected to each other via a communication link 8. These two control devices 4, 6 are designed to control at least a step of the method according to the invention to be performed by the system 2 and thus to control by open-loop control and/or closed-loop control, which is why at least one of these two control devices 4, 6 can also be referred to as controller.

FIG. 1 also shows a plurality of sensors, namely a first sensor 10, second sensor 12 and an n-th sensor 14, as well as a first actuator 16 and another n-th actuator 18. In this case, the described sensors 10, 12, 14 and/or actuators 16, 18 can also be designed as components of the system 2. The actuators 16, 18 shown here are associated with a chassis here and thus wheels of a motor vehicle.

The sensors 10, 12, 14 also associated with the motor vehicle are designed for the purpose of measuring an environment or a surrounding of the motor vehicle using electromagnetic waves, for example, based on video, laser, and/or radar. Values of the sensors 10, 12, 14 which relate to at least one measurement variable of the environment of the motor vehicle are directly transmitted to the first control device 4 in the embodiment described here. These values are merged by the sensor-associated control device 4 in a processing module 20, wherein values of a plurality of sensors 10, 12, 14 are linked to one another and accumulated, and thus, for example, averaged. The thus processed values are further transmitted in a first, low-speed clock cycle from e.g., 40 ms to a processing unit 22 of the first control device 4, wherein this first processing unit 22 is designed for the purpose of preprocessing the values determined by the sensors 10, 12, 14 for a preprocessing, i.e., of filtering locally, possibly recognizing unevenness and then selecting those values which are necessary to control the at least one actuator 16, 18.

These preprocessed and selected values that have been determined within a time interval are transmitted by the first control device 4 via the communication link 8 in a second, faster clock cycle, e.g., every 5 ms to the second control device.

Thus, only preprocessed values of the height profile about a certain position of the ground are transmitted prior to the motor vehicle.

The second control device 6 includes a second control system 24 as well as a plausibility system 26. At the same time, the second control system 24 is designed for the purpose of locally filtering already locally filtered values and at the same time calculating actuating signals for the at least one of the actuators 16, 18 on the basis of these locally and temporally filtered variables. The plausibility system 26 is designed for the purpose of checking the plausibility of the locally filtered transmitted values.

In performing the method according to the invention, only a comparatively small amount of values for the height profile and/or for the direct control of the actuators 16, 18 is transmitted via the communication link 8 between the two control devices 4, 6 in the fast clock cycle, whereas under the first control device 4 using the slow clock cycle, a substantially greater amount of values of the sensors 10, 12, 14 is processed.

Thus, resources of the communication link 8 can be conserved and at a point in time, all already locally filtered values can be transmitted in a package, which would not be possible if the number of values to be transmitted is too large, wherein a greater number of values, if necessary, may need to be distributed in a plurality of packets and transferred at multiple time points one after another. In performing the method, the packets can be transmitted quickly and completely with the few selected locally filtered values in the second clock cycle. Thus, all necessary values that are to be subsequently temporally filtered can be transmitted to the second control system 24 in the second control unit 6.

Thus, it is not necessary that all values acquired by the sensors 10, 12, 14 have to be transferred via the communication link 8, since, by providing the preprocessing, only a comparatively small number of values is to be transferred. If instead all values had to be transferred, this could only be done piecemeal. Further, latency of the values to be transferred is reduced by the method, so that all selected locally filtered values arrive earlier. The received values can be processed by the second control device 6 with less delay. Thus, a height profile of the ground can be determined promptly and completely even when driving the motor vehicle, before the motor vehicle has traveled over a region of the ground to be analyzed. The measure provided as part of the method can increase a useful distance of a prediction of the height profile of the ground.

Furthermore, a deterministic transfer can be performed for the values to be transmitted from the first control device 4 to the second control device 6, wherein it is to be known exactly how much time is required for transmitting a value, wherein a latency caused by the transfer is defined constant or deterministic. If the latency is constant and known, a thus associated time loss can be compensated by a projection.

What is claimed is:

1. A method of controlling at least one actuator of a chassis of a motor vehicle, comprising:
    determining, by at least one sensor of the motor vehicle, values of at least one measurement variable for ascertaining an environment of the motor vehicle;
    preprocessing the determined values by means of a filtering method chosen from the group consisting of forward-backward, weighted moving average and high pass;
    processing the determined values in a first temporal clock cycle;

transmitting in a second temporal clock cycle only those values that are necessary for controlling at least one actuator from a sensor-associated control device to an actuator-associated control device, wherein the second temporal dock cycle is 5.0 ms and the first temporal clock cycle is 2.5 ms;

temporally filtering those values by the actuator-associated control device; and generating actuating signals for the at least one actuator by the actuator-associated control device from the temporally filtered values.

2. The method of claim 1, wherein the values determined by the at least one sensor are locally filtered.

3. The method of claim 2, further comprising selecting from the locally filtered values of the at least one measurement variable those values that are necessary for calculating a manipulated variable.

4. The method of claim 1, wherein the values determined by the at least one sensor are preprocessed by the sensor-associated control device.

5. The method of claim 1, wherein the values determined by the at least one sensor are preprocessed by the at least one sensor.

6. A system for controlling an actuator of a chassis of a motor vehicle, said system comprising:

a first control device operably connected to the actuator; and at least one sensor configured to determine values of at least one measurement variable for ascertaining an environment of the motor vehicle, with the determined values being preprocessed by means of a filtering method chosen from the group consisting of forward-backward, weighted moving average and high pass;

a second control device operably connected to the sensor and configured to process the determined values in a first temporal clock cycle and to transmit to the first control device in a second temporal dock cycle only those values that are necessary for controlling the actuator, wherein the second temporal dock cycle is 5.0 ms and the first temporal clock cycle is 2.5 ms;

said first control device configured to temporally filter those values and to generate actuating signals for the actuator from the temporally filtered values.

7. The system of claim 6, wherein the second control device is configured to preprocess the values determined by the at least one sensor.

8. The system of claim 6, wherein the at least one sensor is configured to ascertain values of the at least one measurement variable with respect to the environment of the motor vehicle.

9. The system of claim 6, wherein the at least one sensor is configured to ascertain a height profile of a roadway traveled by the motor vehicle as the at least one measurement variable.

10. The system of claim 6, further comprising a communication link via which the first and second control devices are connected to each other.

* * * * *